(12) United States Patent
Lee

(10) Patent No.: US 7,415,110 B1
(45) Date of Patent: Aug. 19, 2008

(54) METHOD AND APPARATUS FOR THE GENERATION OF CRYPTOGRAPHIC KEYS

(75) Inventor: David A. Lee, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/275,722

(22) Filed: Mar. 24, 1999

(51) Int. Cl.
*H04L 9/14* (2006.01)
(52) U.S. Cl. ........................................... 380/44
(58) Field of Classification Search ............... 380/44, 380/277, 278, 279, 28; 713/155, 100; 707/9, 707/10, 1
See application file for complete search history.

(56) References Cited

U.S. PATENT DOCUMENTS

| | | | |
|---|---|---|---|
| 4,316,055 A | | 2/1982 | Feistel |
| 4,605,820 A | * | 8/1986 | Campbell, Jr. ............ 178/22.07 |
| 4,607,137 A | * | 8/1986 | Jansen et al. ............. 178/22.05 |
| 4,613,901 A | | 9/1986 | Gilhousen et al. |
| 4,953,208 A | | 8/1990 | Ideno |
| 5,020,106 A | | 5/1991 | Rabold et al. |
| 5,195,136 A | | 3/1993 | Hardy et al. |
| 5,341,426 A | * | 8/1994 | Barney et al. .................. 380/21 |
| 5,412,729 A | * | 5/1995 | Liu .............................. 380/37 |
| 5,509,073 A | | 4/1996 | Monnin |
| 5,533,127 A | * | 7/1996 | Luther .......................... 380/28 |
| 5,590,194 A | | 12/1996 | Ryan |
| 5,621,799 A | | 4/1997 | Katta et al. |
| 5,673,319 A | | 9/1997 | Bellare et al. |
| 5,825,879 A | | 10/1998 | Davis |
| 5,852,472 A | | 12/1998 | Prasad et al. |
| 5,862,150 A | | 1/1999 | Lavelle et al. |
| 5,940,509 A | | 8/1999 | Jovanovich et al. |
| 6,005,940 A | | 12/1999 | Kulinets |
| 6,061,449 A | | 5/2000 | Candelore et al. |
| 6,118,873 A | * | 9/2000 | Lotspiech et al. ........... 380/277 |
| 6,167,136 A | | 12/2000 | Chou |

FOREIGN PATENT DOCUMENTS

| | | |
|---|---|---|
| EP | 0599366 A1 | 11/1993 |
| WO | WO96/06504 | 8/1995 |

(Continued)

OTHER PUBLICATIONS

Heys, H., "Delay Characteristics of Statistical Cipher Feedback Mode," IEEE May 2001, 0-7803-7080, pp. 5-9.

(Continued)

*Primary Examiner*—Kimyen Vu
*Assistant Examiner*—Thomas Gyorfi
(74) *Attorney, Agent, or Firm*—Schwabe, Williamson & Wyatt, P.C.

(57) ABSTRACT

A method for formation of a shared secret key using a key matrix and a corresponding authentication protocol are described. The shared secret key formation scheme is a method in which sets of secret device keys are formed from arithmetic operations on matrix keys of a key matrix. The contents of the key matrix are held in confidence by the certification authority. The selection of which matrix keys to use is based on a key selection vector assigned by the certification authority. From the secret device keys, a shared secret key may be formed in accordance with a selected authentication protocol.

10 Claims, 10 Drawing Sheets

FOREIGN PATENT DOCUMENTS

WO      WO99/19822      9/1998
WO      WO99/18729      10/1998

OTHER PUBLICATIONS

Simmons, G., "Symmetric and Asymmetric Encryption," Computing Surveys, vol. 11, No. 4, Dec. 1979, pp. 305-330.

"High-bandwith Digital Content Protection System," Rev. 1.0, Feb. 17, 2000, Digital Content Protection LLC, ISBN 0-9675129-4-8, pp. 4-59.

Schneier, B., "Applied Cryptography: protocols, algorithms, and source code in C," Second Edition, Library of Congress, Copyright 1996, Chapters 2-6 and 12-17.

* cited by examiner

| SECRET DEVICE KEYS (DP1) | CONTENTS |
|---|---|
| 1_SDKEY1 | $K_{21} + K_{31}$ |
| 1_SDKEY2 | $K_{22} + K_{32}$ |
| 1_SDKEY3 | $K_{23} + K_{33}$ |
| 1_SDKEY4 | $K_{24} + K_{34}$ |
| 1_SDKEY5 | $K_{25} + K_{35}$ |

| SECRET DEVICE KEYS (DP2) | CONTENTS |
|---|---|
| 2_SDKEY1 | $K_{12} + K_{13}$ |
| 2_SDKEY2 | $K_{22} + K_{23}$ |
| 2_SDKEY3 | $K_{32} + K_{33}$ |
| 2_SDKEY4 | $K_{42} + K_{43}$ |

Figure 10

| SECRET DEVICE KEYS (DP1) | CONTENTS |
|---|---|
| 1_SDKEY1 | $K_{21} + K_{31}$ |
| 1_SDKEY2 | $K_{22} + K_{32}$ |
| 1_SDKEY3 | $K_{23} + K_{33}$ |
| 1_SDKEY4 | $K_{24} + K_{34}$ |

| SECRET DEVICE KEYS (DP2) | CONTENTS |
|---|---|
| 1_SDKEY5 | $K_{12} + K_{14}$ |
| 1_SDKEY6 | $K_{22} + K_{24}$ |
| 1_SDKEY7 | $K_{32} + K_{34}$ |
| 1_SDKEY8 | $K_{42} + K_{44}$ |

| SECRET DEVICE KEYS (DP1) | CONTENTS |
|---|---|
| 2_SDKEY1 | $K_{12} + K_{13}$ |
| 2_SDKEY2 | $K_{22} + K_{23}$ |
| 2_SDKEY3 | $K_{32} + K_{33}$ |
| 2_SDKEY4 | $K_{42} + K_{43}$ |

| SECRET DEVICE KEYS (DP2) | CONTENTS |
|---|---|
| 2_SDKEY5 | $K_{21} + K_{31}$ |
| 2_SDKEY6 | $K_{22} + K_{32}$ |
| 2_SDKEY7 | $K_{23} + K_{33}$ |
| 2_SDKEY8 | $K_{24} + K_{34}$ |

590, 591, 592, 593

METHOD AND APPARATUS FOR THE GENERATION OF CRYPTOGRAPHIC KEYS

BACKGROUND

1. Field

The invention relates to the field of data security. In particular, the present invention relates to a method and apparatus for generating cryptographic keys using a key matrix.

2. Background Art

In today's society, it is becoming more and more desirable to transmit digital information from one location to another in a manner that is clear and unambiguous to a legitimate receiver, but incomprehensible to any illegitimate recipients. Accordingly, such information is typically encrypted using one of two commonly used cryptographic techniques: public key cryptography and symmetric key cryptography.

In symmetric key cryptography, a commonly possessed, symmetric key is used to encrypt and decrypt a message transmitted between a legitimate sender and a receiver. Such encryption and decryption is performed through well-known conventional algorithms such as Data Encryption Standard (DES). Although symmetric key cryptography is computationally simple, it relies on both parties maintaining the secrecy of the symmetric key. Also, the management of symmetric keys tends to be complex. Simply stated, if each sender needs a different symmetric key to communicate with each legitimate receiver, it is difficult, if not impossible, for use by businesses having a large number of employees. For example, in a business of 1000 employees, a maximum of 499,500 (1000×999/2) keys would need to be managed, provided that each employee is capable of communicating with any another employee within the business.

In general, public key cryptography involves the use of a public key and a private key (collectively referred to as a "key pair") which are two separate, but related keys. Normally, the public key is publicly available and widely used for encrypting a message directed to the owner of the key pair. The private key is maintained in confidence and usually is used for decryption of incoming encrypted message. As a result, public key cryptography tends to be more secure than symmetric key cryptography, but it is more cumbersome and computationally intensive. The intense computations tend to prevent consumer electronic devices and other lower performance devices from using public key cryptography.

Diffie-Hellman Key Exchange, a hybrid cryptographic technique developed in the late 1970s (U.S. Pat. No. 4,200, 770), allows two or more parties to exchange information over a public channel to form a secret that is known by all parties involved, but of which eavesdroppers cannot infer. While generation and use of the "secret" achieves the simplicity of symmetric key cryptography, its calculation is also computationally intensive. Diffie-Hellman involves the calculation of the secret through modular exponents over very large prime modular fields (e.g., 1024-bit binary numbers).

On or around 1985, elliptic curve cryptography (ECC) was proposed. ECC involves the translation of cryptographic techniques from modular exponentiation to scalar multiplication over an elliptic curve over a finite field. ECC helped alleviate the mathematical strain of performing these cryptographic calculations on smaller-sized integers to provide, in theory, a comparable level of security as that of the modular exponentiation over much larger-sized prime fields. However, this is only a partial performance improvement over modular exponentiation, and it also adds further to the complexity of implementation due to the extensive mathematical calculations involved.

In light of the foregoing, it would be desirable to develop a cryptographic technique that provides the security advantages of public key cryptography without the disadvantages of being cumbersome and computationally intensive. Furthermore, it would be desirable for the cryptographic technique to seamlessly work with revocation protocols to protect the system from reverse-engineering attacks.

SUMMARY OF THE INVENTION

Briefly, one embodiment of the invention is a method comprising providing a key matrix having N rows and M columns of matrix keys, where $N \geq 2$ and $M \geq 2$. For each column of the key matrix, arithmetic operations are performed on matrix keys of at least two selected rows of the key matrix to produce a first set of secret device keys. Then, a shared secret key is produced based on arithmetic operations on selected secret device keys of the first set of secret device keys.

BRIEF DESCRIPTION OF THE DRAWINGS

The features and advantages of the present invention will become apparent from the following detailed description of the present invention in which:

FIG. 10 is an illustrative block diagram of a first secret device key set provided to the first digital platform using the key matrix of FIG. 9.

FIG. 11 is an illustrative block diagram of a second secret device key set provided to the first digital platform using the key matrix of FIG. 9.

FIG. 12 is an illustrative block diagram of a secret device key set provided to the second digital platform acting as an information receiver using the key matrix of FIG. 9.

FIG. 13 is an illustrative block diagram of an alternate secret device key set provided to the second digital platform acting as an information provider using the key matrix of FIG. 9.

DETAILED DESCRIPTION

Figure 1:
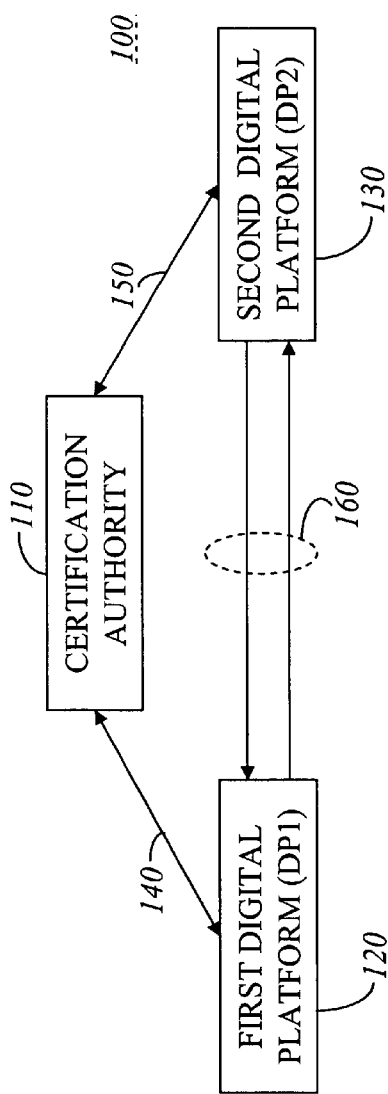
FIG. 1 is an illustrative block diagram of an embodiment of a network featuring a certification authority dispensing keys produced from a key matrix.

In brief, the present invention relates to a system and method for generating cryptographic keys using a key matrix. In the following description, numerous specific details are set forth in order to provide a thorough understanding of the present invention. It will be obvious to one skilled in the art, however, that the present invention may be practiced without these specific details.

To clarify various characteristics and features of the present invention, certain terminology is used. For example, a "digital platform" is defined as any hardware with processing and internal data storage capabilities. Examples of digital platforms include, but are not limited or restricted to the following: computers (e.g., laptops, desktops, hand-helds, servers, mainframes, etc.), imaging equipment (e.g., printers, facsimile machines, scanners, digital cameras, etc.), set-top boxes (e.g., television control boxes for cable or satellite transmissions), wireless communication equipment (e.g., cellular phones, pagers, etc.), consumer electronic appliances and the like. A "channel" is generally defined as one or more pathways through which information may be transferred (directly, indirectly or broadcast) over information-carrying mediums such as, for example, electrical wire, fiber optic, cable, bus, plain old telephone system (POTS) line, wireless (e.g., satellite, radio frequency "RF", infrared, etc.) or even a logical link. "Information" is defined as data, address, control or any combination thereof.

With respect to cryptography related terminology, the term "secure" indicates a state where it is not reasonably feasible for an unauthorized individual to access information in an non-encrypted format. A "key" is generally defined as an encoding and/or decoding parameter usually structured as a sequence of binary data. A "digital signature" includes digital information signed with a private key of its signatory to ensure that the digital information has not been illicitly modified after being digitally signed. This digital information may be provided in its entirety or as a digest produced by a one-way hash function. The "one-way hash function" includes a function, mathematical or otherwise, that converts information from a variable-length to a fixed-length (referred to as a "digest"). The term "one-way" indicates that there does not readily exist an inverse function to recover any discernible portion of the original information from the fixed-length digest. Examples of a hash function include MD2 or MD5 provided by RSA Data Security of Redwood City, Calif., or Secure Hash Algorithm (SHA-1) as specified by the National Institute of Standards and Technology located in Washington, D.C.

In addition, a "digital certificate" includes digital information used to authenticate a sender of information. For example, a digital certificate may include information concerning a person, entity or device being certified that is encrypted with the private key of a certification authority. Examples of a "certification authority" include an original equipment manufacturer (OEM), a software vendor, a trade association, a governmental entity, a bank or any other trusted business or person.

Referring now to FIG. 1, an illustrative block diagram of an embodiment of a network 100 employing at least two digital platforms is shown. Network 100 includes a first digital platform 120 and a second digital platform 130 capable of establishing communications with certification authority 110 via channels 140 and 150, respectively. Platforms 120 and 130 can register with certification authority 110 in order to receive secret device keys therefrom. Each platform 120 or 130 can be classified as either (i) an information provider, or (ii) an information receiver, or (iii) a transceiver capable of operating as either an information provider or an information receiver. Of course, other classification schemes may be utilized so long as communicative platforms have compatible classifications. Also, first and second digital platforms 120 and 130 communicate with each other via channel 160.

Figure 2:
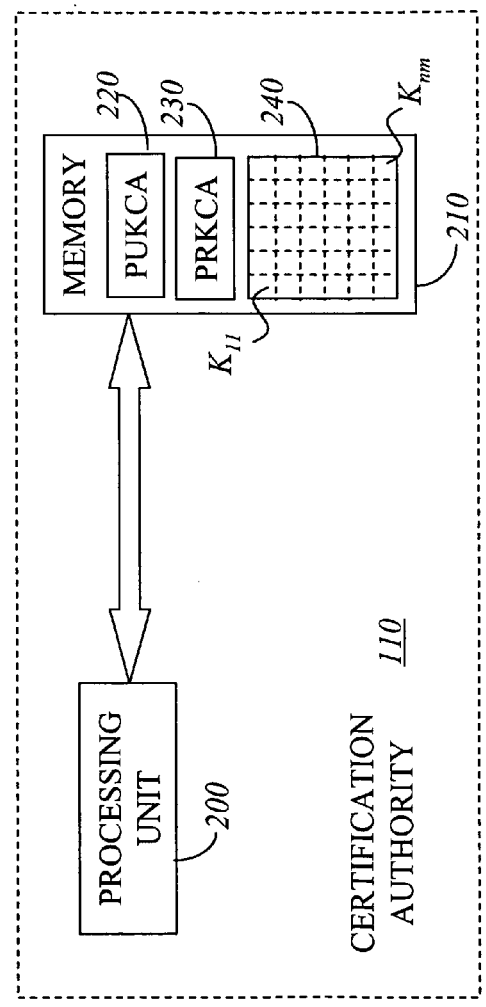
FIG. 2 is an illustrative block diagram of the certification authority of the network of FIG. 1.

As shown in FIG. 2, an embodiment of certification authority 110 is shown. Certification authority 110 comprises a digital platform that includes a processing unit 200 and memory 210. In particular, processing unit 200 is any hardware having code processing capabilities such as, for example, a central processing unit, a microcontroller, a coprocessor, a state machine and the like. Processing unit 200 accesses information from memory 210. In one embodiment, memory 210 is volatile memory with data backed-up in non-volatile storage. Of course, it is contemplated that memory 210 may be implemented to operate as non-volatile memory to ensure that its contents are retained during a power-down condition. Thus, memory 210 may include, for example, (i) read only memory (ROM), (ii) any type of programmable read only memory (PROM) such as erasable PROM (EPROM) or electrically erasable PROM (EEPROM), (iii) flash memory, or even (iv) battery-backed volatile memory.

Memory 210 retains the certification authority's public key (PUKCA) 220, its private key (PRKCA) 230, and a multi-dimensional matrix 240 of matrix keys (K) arranged in grids (e.g., rows, columns, along z-axis, etc.) held in secret to be known only by certification authority 110 of FIG. 1. PUKCA 220 and PRKCA 230 are provided to support matrix key authentication schemes, not the formation of shared secret key "SECKEY". Currently, each key is 64-bits, although any bit size may be used (e.g., 32, 128, 160, 256, 512, 1024 . . . ). For increased protection, PRKCA 230 and key matrix 240 may be obfuscated by tamper-resistant software. The dimensions of key matrix 240 and length of the matrix keys correspond to the desired strength of security for network 100 of FIG. 1.

In the event that key matrix 240 is a two-dimensional n×m matrix, for example, one matrix dimension (e.g., "n" rows) may be assigned to a first platform classification while the other matrix dimension (e.g., "m" columns) is assigned to a second platform classification. The "platform classifications" need only be something that can differentiate participants of the authentication. Thus, the classification may be (1) information provider/information receiver; (2) multiple types of information providers; and (3) multiple types of information receivers and the like. Thus, if the first platform classification is an information provider, it would receive "m" secret device key sets created by performing arithmetic operations on the matrix keys situated in selected "p" rows (p<n) for each column. For this embodiment, the arithmetic operation involves modular addition, although exclusive-or (XOR) operations, non-modular addition or other operations may be used. Information receivers (second class), however, would receive "n" secret device key sets created by performing arithmetic operations on the matrix keys situated in selected "q" columns (q<m) for each row. For maximum security, "p" is equal to n/2 and "q" is equal to m/2; however, p or q may be any selected number of rows or columns less than n or m, respectively (see FIG. 6).

Figure 3:
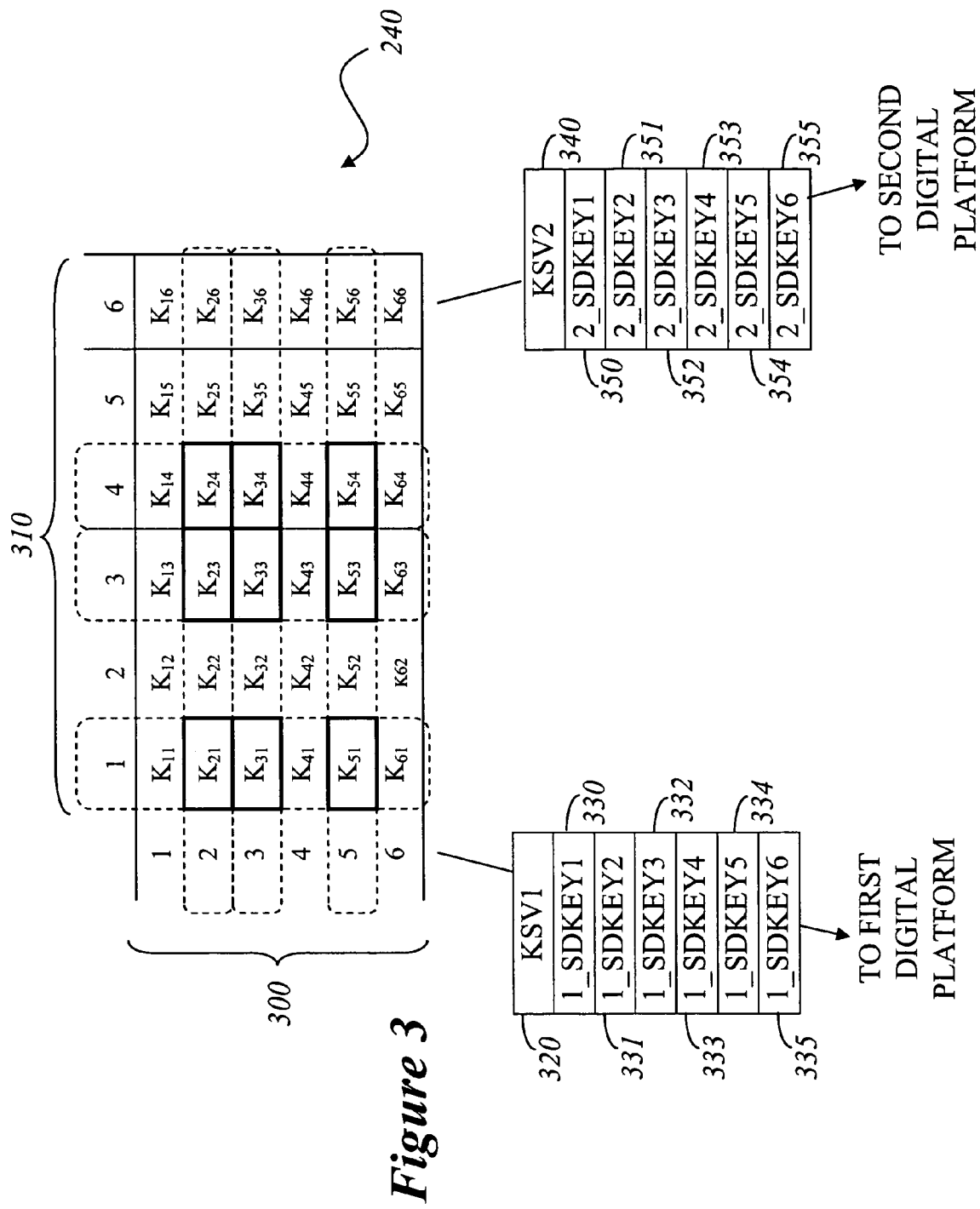
FIG. 3 is an illustrative block diagram of a first embodiment of a two-dimensional key matrix.

Referring now to FIG. 3, an illustrative block diagram of a first embodiment of key matrix 240 is shown. Key matrix 240 is a two-dimensional, n×m matrix with a first dimension (e.g., rows) 300 dedicated to a first platform classification (e.g., an "information provider" class) and a second dimension (e.g., columns) 310 dedicated to a second platform classification (e.g., an "information receiver" class). For clarity sake, key matrix 240 is represented as a 6×6 matrix; however, key matrix 240 normally comprises a larger-sized matrix, even a 40×40 matrix or larger. It is contemplated that the dedication of matrix dimensions for each class could be different. For example, columns and rows could be dedicated to the "information provider" and "information receiver" classes, respectively.

Figure 4:
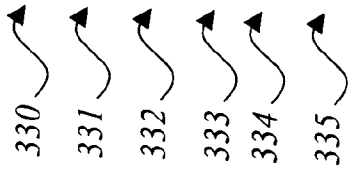
FIG. 4 is an illustrative block diagram of a first secret device key set and a key selection vector provided to the first digital platform using the key matrix of FIG. 3.

For each digital platform, the certification authority generates a combination of rows or columns associated with key matrix 240. Preferably, the combination is unique, but uniqueness is not required. For example, in this embodiment, if the first digital platform is classified as an information provider, the certification authority generates a combination of rows, which is represented as a first key selection vector (KSV1) 320 for the first digital platform. Herein, KSV1 320 is equal to <2, 3, 5>. Based on KSV1 320, the certification authority generates a set of secret device keys (1_SDKEY1-1_SDKEY6) 330-335 and provides both KSV1 320 and the first set of secret device keys 330-335 to the first digital platform. As shown in FIG. 4, secret device keys 330-335 are generated through modular addition (e.g., modulo $2^{64}$) of matrix keys in the selected rows of key matrix 240 for each column.

Figure 5:
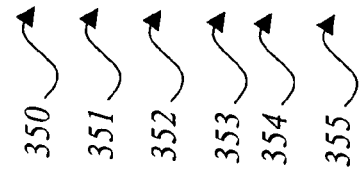
FIG. 5 is an illustrative block diagram of a second secret device key set and a key selection vector provided to the second digital platform using the key matrix of FIG. 3.

Referring back to FIG. 3, if the second digital platform is classified as an information receiver, the certification authority generates a combination of columns associated with key matrix 240, which is represented as a second key selection vector (KSV2) 340. Herein, KSV2 340 is equal to <1, 3, 4>. Based on KSV2 340, certification authority generates a set of secret device keys (2_SDKEY1-2_SDKEY6) 350-355 and provides both KSV2 340 and the set of secret device keys 350-355 to the second digital platform. As shown in FIG. 5, for each row, the second set of secret device keys 350-355 are produced through modular addition of the matrix keys of key matrix 240 pertaining to those columns selected by KSV2 340.

To secure channel 160 of FIG. 1, the first and second digital platforms exchange KSV1 320 and KSV2 340. Hence, based on KSV2 340, the first digital platform creates a shared secret key (SECKEY) equivalent to the modular addition of 1_SDKEY1, 1_SDKEY3 and 1_SDKEY4. Concurrently, based on KSV1 320, the second digital platform also produces SECKEY through modular addition of 2_SDKEY2, 2_SDKEY3 and 2_SDKEY5. As shown in equation (1), SECKEY is determined to be the following:

$$SECKEY \text{ (at } DP1) = \qquad (1)$$
$$(K21 + K31 + K51) + (K23 + K33 + K53) + (K24 + K34 + K54) =$$
$$(K21 + K23 + K24) + (K31 + K33 + K34) + (K51 + K53 + K54)$$

Figure 6:
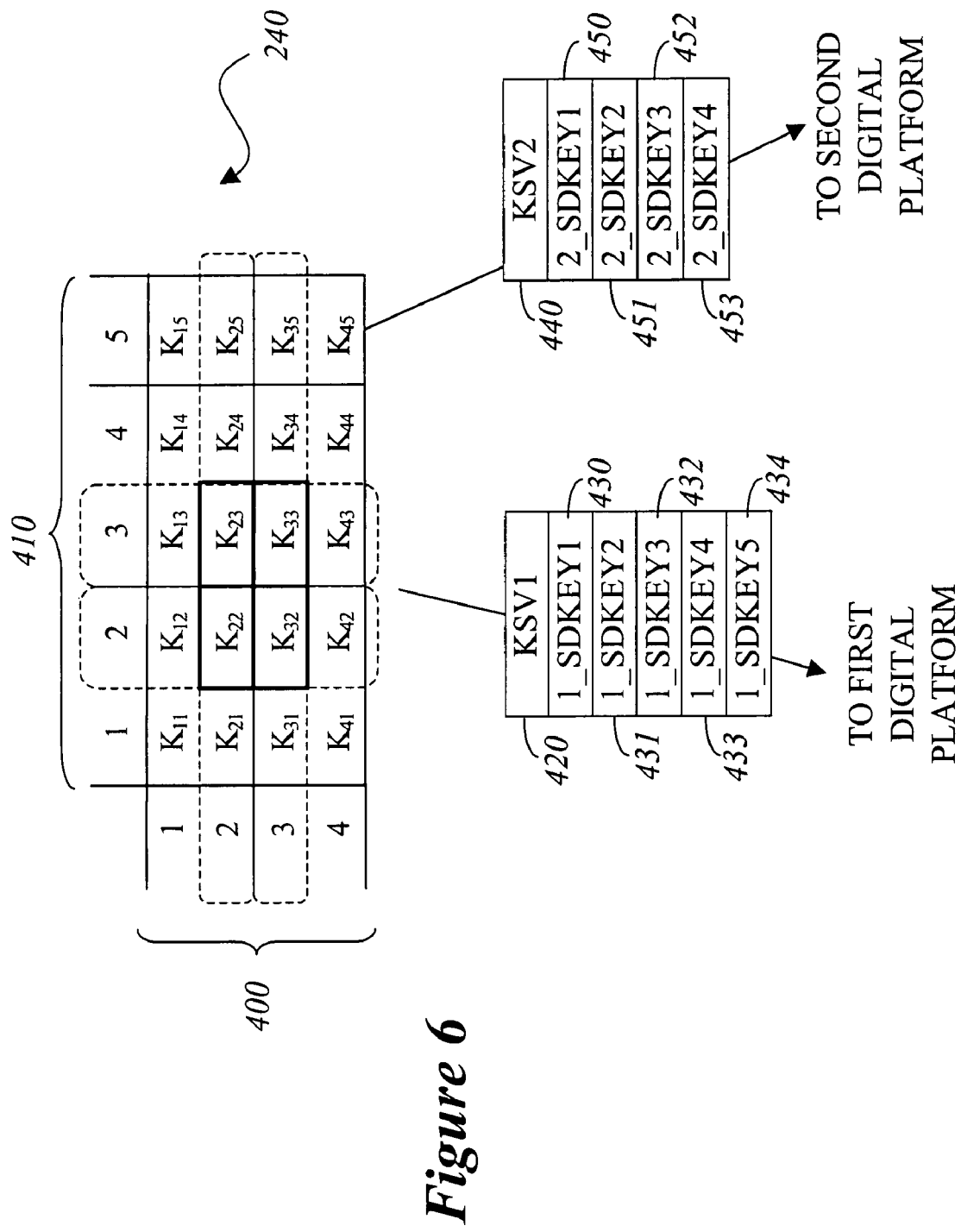
FIG. 6 is an illustrative block diagram of a second embodiment of a two-dimensional key matrix.

Referring now to FIG. 6, an illustrative block diagram of a second embodiment of key matrix 240 is shown. Key matrix 240 is a two-dimensional, n×m matrix with a first dimension (e.g., rows) 400 dedicated to the "information provider" class and a second dimension (e.g., columns) 410 dedicated to the "information receiver" class. For clarity sake, key matrix 240 is represented as a rectangular (4×5) matrix in lieu of a square (6×6) matrix as shown in FIG. 3.

Figure 7:
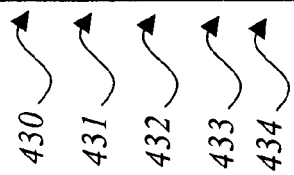
FIG. 7 is an illustrative block diagram of a first secret device key set and a key selection vector provided to the first digital platform using the key matrix of FIG. 6.

Similarly, before providing keys to a digital platform, the certification authority generates a key selection vectors for that digital platform. For example, if the first digital platform is classified as an information provider, the certification authority generates a first key selection vector (KSV1) 420 to identify the selected combination of rows. Herein, KSV1 420 is equal to <2, 3> for example. Based on KSV1 420, certification authority generates a set of secret device keys (1_SDKEY1-1_SDKEY5) 430-434 and provides both KSV1 420 and a first set of secret device keys 430-434 to the first digital platform. As shown in FIG. 7, secret device keys 430-434 are generated through modular addition on matrix keys in key matrix 240 that are associated with the rows selected by KSV1 420.

Figure 8:
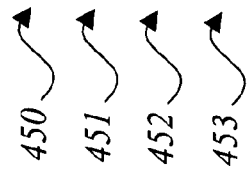
FIG. 8 is an illustrative block diagram of a second secret device key set and a key selection vector provided to the second digital platform using the key matrix of FIG. 6.

Referring back to FIG. 6, if the second digital platform is classified as an information receiver, the certification authority generates a combination of columns stored in a second key selection vector (KSV2) 440. Herein, KSV2 440 is equal to <2, 3>. Based on KSV2 440, certification authority generates a second set of secret device keys (2_SDKEY1-2_SDKEY4) 450-453 and provides both KSV2 440 and secret device keys 450-453 to the second digital platform. Only four (4) secret device keys 450-453 are provided in this example because key matrix 240 features four rows. As shown in FIG. 8, secret device keys 450-453 are produced through modular addition of the matrix keys of key matrix 240 for those columns selected by KSV2 440.

To generate SECKEY, the first and second digital platforms still exchange KSV1 420 and KSV2 440. Hence, based on KSV2 440, the first digital platform creates SECKEY equivalent to the modular addition of 1_SDKEY2 and 1_SDKEY3. Based on KSV1 420, the second digital platform generates SECKEY through modular addition of 2_SDKEY2 and 2_SDKEY3. As a result, as shown in equation (2), SECKEY is calculated to be the following:

$$K22+K32+K23+K33=SECKEY=K22+K23+K32+K33 \qquad (2)$$

Figure 9:
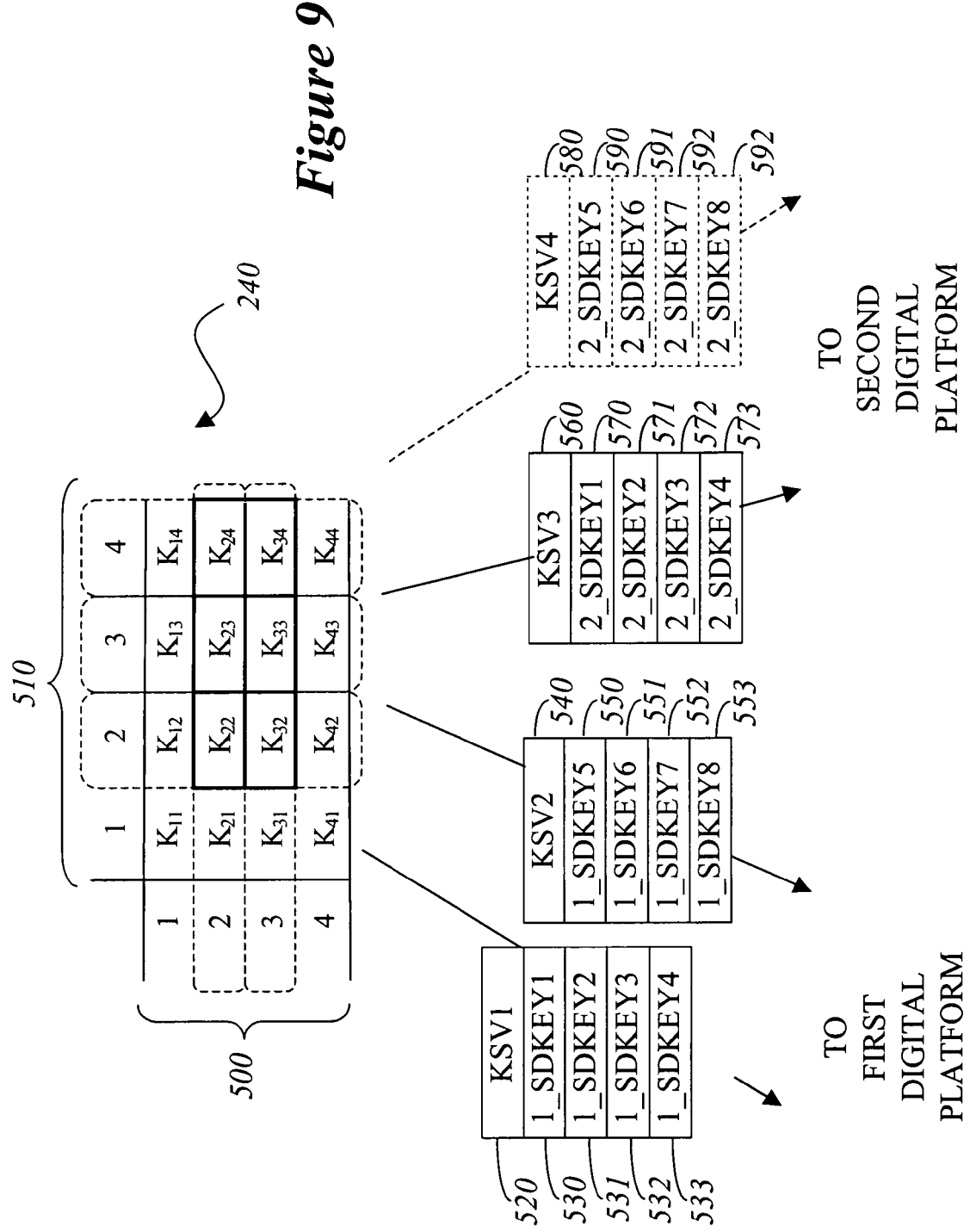
FIG. 9 is an illustrative block diagram of a third embodiment of a two-dimensional key matrix.

Referring now to FIG. 9, an illustrative block diagram of a third embodiment of key matrix 240 is shown. Key matrix 240 is a two-dimensional, n×m matrix with a first dimension (e.g., rows) 500 dedicated to the "information provider" class and a second dimension (e.g., columns) 510 dedicated to the "information receiver" class. For clarity sake, key matrix 240 is symmetric and represented as a 4×4 matrix.

Before providing keys into a digital platform, the certification authority generates key selection vectors for that digital platform. Likewise, these vectors may be unique to achieve better security. Since first digital platform is a transceiver in this embodiment, it would be required to store two sets of secret device keys. One set would be used when the first digital platform is functioning as an information provider and the other set would be used when functioning as an information receiver. In this embodiment, the certification authority assigns a first key selection vector (KSV1) 520, equal to <2, 3> when the first digital platform is functioning as an information provider. Also, the certification authority assigns a second key selection vector (KSV2) 540, equal to <2, 4>, when the first digital platform functions as an information receiver. Of course, KSV1 and KSV2 may be equivalent for simplicity.

Based on KSV1 520, the certification authority generates a set of secret device keys (1_SDKEY1-1_SDKEY4) 530-533 and provides both KSV1 520 and secret device keys 530-533 to the first digital platform. As shown in FIG. 10, the set of secret device keys 530-533 are produced through modular addition on the matrix keys of key matrix 240 for rows selected by KSV1 520.

Based on KSV2 540, the certification authority also produces a set of secret device keys (1_SDKEY5-1_SDKEY8) 550-553 and provides both KSV2 540 and secret device key sets 550-553 to the first digital platform for use when acting as an information receiver. As shown in FIG. 11, secret device keys 550-553 are generated through modular addition on the matrix keys of key matrix 240 for columns selected by KSV2 540.

Thereafter, if the second digital platform is classified as an information receiver, the certification authority generates a third key selection vector (KSV3) 560. Herein, KSV3 560 is equal to <2, 3>. Based on KSV3 560, the certification authority generates a set of secret device keys (2_SDKEY1-2_SD-KEY4) 570-573 and provides both KSV3 560 and secret device keys 570-573 to the second digital platform. As shown in FIG. 12, secret device keys 570-573 are produced through modular addition on the matrix keys of key matrix 240 for columns selected by KSV3 560.

To generate SECKEY, KSV1 520 and KSV3 560 are exchanged between the first and second digital platforms. Hence, based on KSV3 560, the first digital platform creates a shared secret key (SECKEY) equivalent to the modular addition of 1_SDKEY2 and 1_SDKEY3. Based on KSV1 520, the second digital platform generates SECKEY through modular addition of 2_SDKEY2 and 2_SDKEY3, where SECKEY is determined as follows:

$$K22+K32+K23+K33=SECKEY=K22+K23+K32+K33$$

If the second digital platform is alternatively classified as an information provider as shown by dashed lines, the certification authority would have generated a fourth key selection vector (KSV4) 580. Herein, KSV4 580 is equal to <2, 3>. Based on KSV4 580, certification authority generates a set of secret device keys (2_SDKEY5-2_SDKEY8) 590-593 and provides both KSV4 580 and secret device keys 590-593 to the second digital platform. As shown in FIG. 13, secret devices keys 590-593 are generated by performing modular addition on the matrix keys of key matrix 240 for columns selected by KSV4 580.

To generate the shared secret key for providing a secure channel, KSV2 540 and KSV4 580 are exchanged between the first and second digital platforms. Hence, based on KSV4 580, the first digital platform creates a shared secret key (SECKEY) equivalent to the modular addition of 1_SDKEY6 and 1_SDKEY7. Based on KSV2 540, the second digital platform generates SECKEY through modular addition of 2_SDKEY6 and 2_SDKEY8. The SECKEY is determined as follows:

$$K22+K24+K32+K34=SECKEY=K22+K32+K24+K34$$

Figure 14:
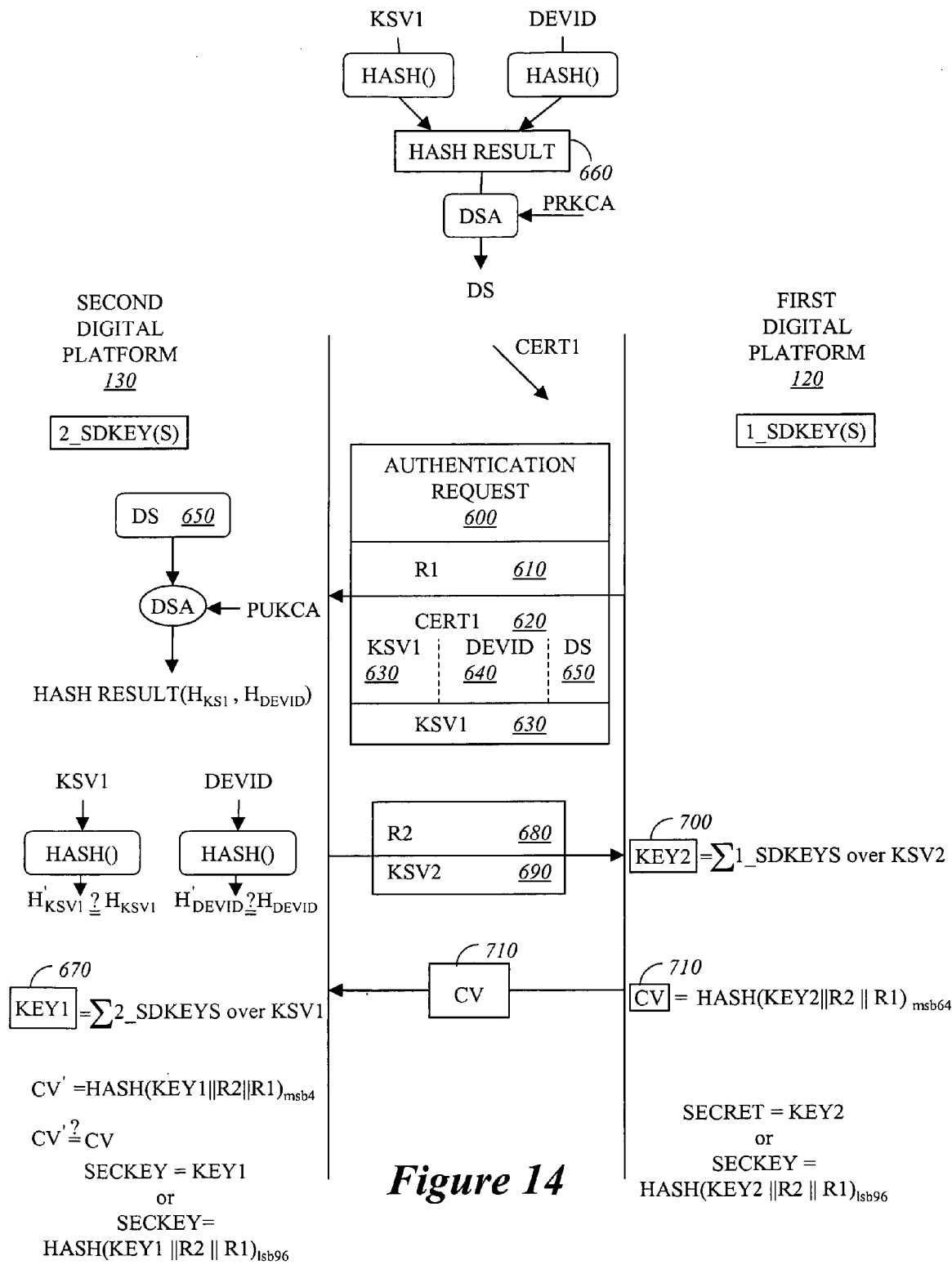
FIG. 14 is an illustrative block diagram of a matrix authentication scheme with revocation between the first digital platform and the second digital platform of FIG. 1.
Figure 15:
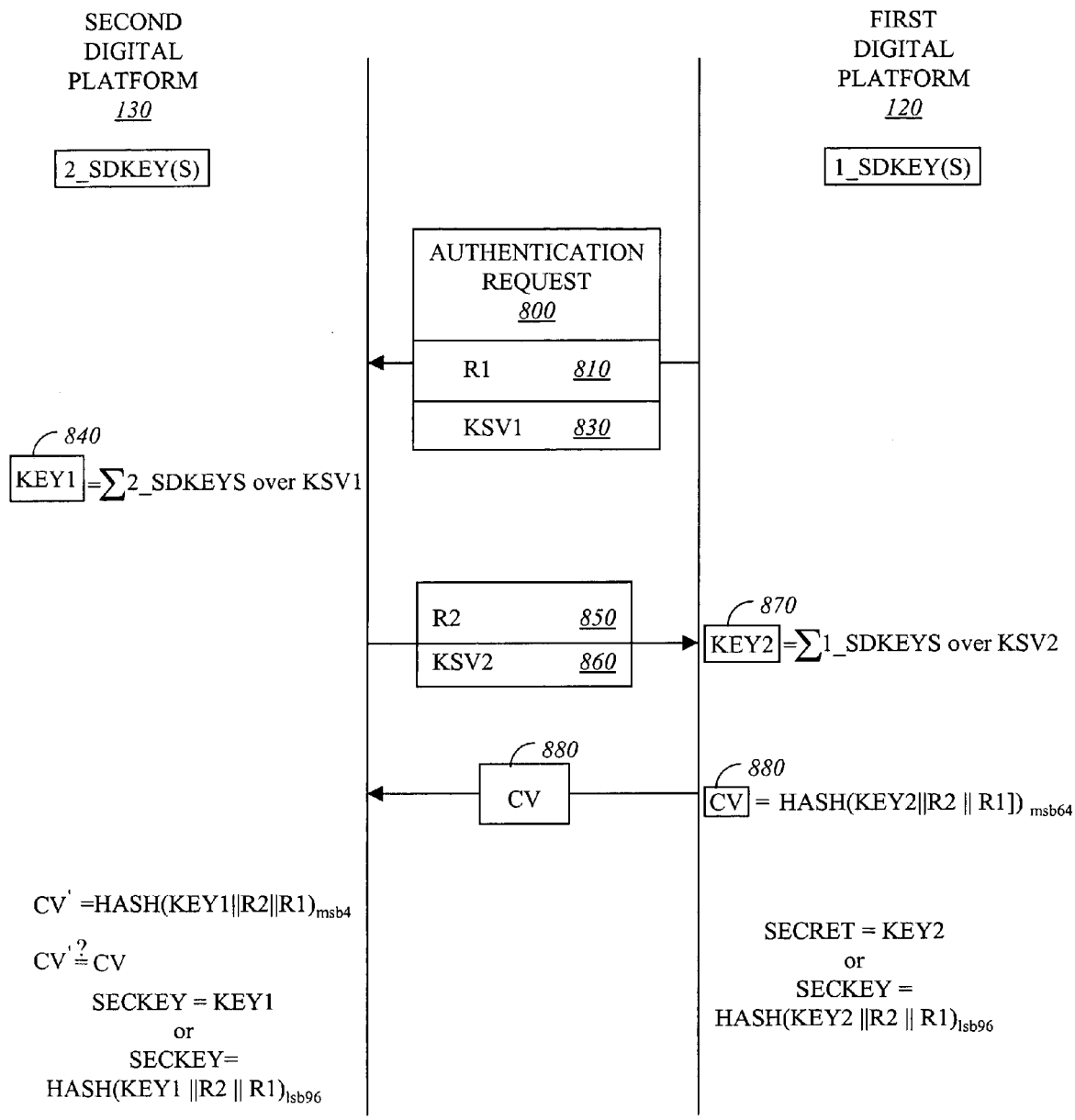
FIG. 15 is an illustrative block diagram of a matrix authentication scheme without revocation between the first digital platform and the second digital platform of FIG. 1.

Referring back to FIG. 1, when digital platforms 120 and 130 are in compatible classes (e.g., one platform functioning as an information provider while the other platform functioning as an information receiver) and decide to inter-operate, both digital platforms 120 and 130 undergo a matrix authentication scheme, namely either a matrix authentication with revocation (see FIG. 14) or a matrix authentication without revocation (see FIG. 15). During the matrix authentication scheme, various secret device key sets of each digital platform 120 and 130 are used produce a shared secret key used to secure channel 160.

Referring now to FIG. 14, an illustrative embodiment of a matrix authentication with revocation scheme between first digital platform 120 and second digital platform 130 is shown. In this embodiment, first digital platform 120 sends an authentication request 600 to second digital platform 130. Authentication request 600 comprises a random number (R1) 610, a digital certificate (CERT1) 620 and a key selection vector associated with first digital platform (KSV1) 630. KSV1 630 comprises information to indicate the combination of rows or columns selected for first digital platform 120. R1 610 is a random number used to prevent replay. In this embodiment, CERT1 620 comprises KSV1 630, a device identification (DEVID) 640 and possibly other values for first digital platform and a digital signature 650, all of which certified by PRKCA 220. Digital signature 650 comprises a hash result 660 of KSV1 630 and DEVID 640 after undergoing a one-way hash function and the hash result 660 being digitally signed with PRKCA 220.

Upon receiving authentication request 600, second digital platform 130 authenticates first digital platform 120 by recovering KSV1 630, DEVID 640 and digital signature 650 because PUKCA 220 is widely available. DEVID 640 is used by second digital platform 130 to determine whether first digital platform 120 is authorized to communicate in a secure fashion with second digital platform 130 by checking the revocation list. If so, KEY1 670 is generated based on KSV1 630 provided by first digital platform 120. If not, the authentication request is ignored.

Thereafter, second digital platform 130 provides a random number (R2) 680 and its selection vector (KSV2) 690 to first digital platform 120. From that, first digital platform 120 creates KEY2 700 and a check hash value (CV) 710. CV 710 is equivalent to a hash operation performed on the concatenation of KEY2 700, R1 610 and R2 680. CV 710 is provided to second digital platform 130 and compared with a resultant value of a hash of KEY1 670, R1 610 and R2 680. If CV 710 matches the resultant hash value, both KEY1 and KEY2 670 and 680 are identical and used as a shared secret key. Alternatively, identical portions of KEY1 and KEY2 670 and 680 may be used as the shared secret key or even the hash result itself.

Of course, this is an illustrative example of the matrix authentication scheme. The matrix authentication scheme may be devised without the use of digital signatures.

Referring to FIG. 15, an illustrative embodiment of a matrix authentication scheme without revocation between first digital platform 120 and second digital platform 130 is shown. In this embodiment, first digital platform 120 sends authentication request 800 to second digital platform 130. Authentication request 800 comprises a random number (R1) 810, and a key selection vector associated with first digital platform (KSV1) 830. KEY1 840 is calculated based on KSV1 830 provided by first digital platform 120.

Thereafter, second digital platform 130 provides a random number (R2) 850 and its selection vector (KSV2) 860 to first digital platform 120. From that, first digital platform 120 creates KEY2 870 and a check hash value (CV) 880. CV 880 is equivalent to a hash operation performed on the modular addition result of KEY2 870, R1 810 and R2 850. CV 880 is provided to second digital platform 130 and compared with a resultant value of a hash of KEY1 840, R1 810 and R2 850. If CV 880 matches the hash result, both KEY1 and KEY2 840 and 870 are identical. Thus, these keys 840 and 870 or portions thereof may be used as the shared secret key (SECKEY). Also, KEY1 and KEY2 may be used in combination with other data in possession by both digital platforms to produce SECKEY.

It is contemplated that matrix key authentication is not limited to simply two parties. It is possible to use matrix key authorization simultaneously between three or more parties. This is accomplished by extending the dimensions of the key matrix held by the certification authority for each additional party, and the dimensions of the number of matrix keys given to the various participants.

For example, in a three-way authentication scheme, a three-dimensional (3D) key matrix is needed where the matrix dimensions do not have to be equal. The 3D key matrix supports three "classes" of digital platforms, which we will refer to as Class 1, Class 2 and Class 3. These classes need only be something that can be differentiated between the participants of the authentication. Some examples might be (1) information source/intermediate information filter/information receiver; (2) information source for information type A, information source for information type B, information receiver; (3) authentication initiator, next device found to authenticate, third device to authenticate; (4) lowest device identification number, middle device identification number, highest device identification number, etc. The digital platforms receive secret device key sets for each class they might belong to.

In this embodiment, a 4×6×8 key matrix of 192 keys is provided. The first dimension is of size 4 and is for Class 1. The second dimension is of size 6 and is for Class 2. The third dimension is of size 8 and is for Class 3. For clarity sake, matrix keys are labeled "$K_{xyz}$" where the first subscript (x) is the index of the first dimension, the second subscript (y) is the index of the second dimension, and the third subscript (z) is the index of the third dimension (Class 3).

Platform A is of Class 1 and is assigned combination <2, 3>. It receives a 6×8 matrix of keys $A_{yz}$, where $A_{yz}=K_{2yz}+K_{3yz}$.

Platform B is of Class 2 and is assigned combination <3, 5, 6>. It receives a 4×8 matrix of keys $B_{xz}$, where $B_{xz}=K_{x3z}+K_{x5z}+K_{x6z}$.

Platform C is of Class 3 and is assigned combination <1, 4, 5, 7>. It receives a 4×6 matrix of keys $C_{xy}$, where $C_{xy}=K_{xy1}+K_{xy4}+K_{xy5}+K_{xy7}$.

During authentication, the three digital platforms provide each other with their respective key selection vectors, and they subsequently combine their keys along the dimensions associated with the other platforms' key selection vectors.

Platform A receives key selection vector <3, 5, 6> from platform B (corresponding to the first dimension of platform A's secret device key set), and key selection vector <1, 4, 5, 7> from platform C (corresponding to the second dimension of its secret A keys). Platform A then performs arithmetic operations on its secret device key sets ($A_{yz}$) for y=3, 5, 6 and z=1, 4, 5, 7 to calculate the shared secret key (SECKEY) from the following:

$A_{31}+A_{34}+A_{35}+A_{37}+A_{51}+A_{54}+A_{55}+A_{57}+A_{61}+A_{64}+A_{65}+A_{67}=(K_{231}+K_{331})+(K_{234}+K_{334})+(K_{235}+K_{335})+(K_{237}+K_{337})+(K_{251}+K_{351})+(K_{254}+K_{354})+(K_{255}+K_{355})+(K_{257}+K_{357})+(K_{261}+K_{361})+(K_{264}+K_{364})+(K_{265}+K_{365})+(K_{267}+K_{367})$. This is the sum of all $K_{ijk}$ for i=2, 3; j=3, 5, 6; and k=1, 4, 5, 7.

Platform B receives key selection vector <2, 3> from platform A and key selection vector <1, 4, 5, 7> from platform C. Platform B then performs arithmetic operations on its secret device key sets ($B_{xz}$) for x=2, 3 and z=1, 4, 5, 7 to calculate the following: $B_{21}+B_{24}+B_{25}+B_{27}+B_{31}+B_{34}+B_{35}+B_{37}$. This is also equal to the sum of all $K_{ijk}$ for i=2, 3; j=3, 4, 5; and k=1, 4, 5, 7.

Platform C receives key selection vector <2, 3> from platform A and key selection vector <3, 5, 6> from platform B. Platform C then performs arithmetic operations on its secret device key sets ($C_{xy}$) for x=2, 3 and y=3, 5, 6 to calculate the following: $C_{23}+C_{25}+C_{26}+C_{33}+C_{35}+C_{36}$. This is also equal to the sum of all $K_{ijk}$ for i=2, 3; j=3, 5, 6; and k=1, 4, 5, 7.

The three digital platforms have each calculated a shared secret value that they all agree upon. An eavesdropper cannot calculate SECKEY without knowing the secret device key set of at least one of the respective devices. An interloper cannot emulate one of the three platforms to participate in this shared secret key formation without having available a set of secret device keys of the class it is emulating derived for the same key matrix kept secret by the certification authority.

Of course, the invention described herein may be designed in many different methods and using many different key manipulation schemes or circuitry. While the present invention has been described in terms of various embodiments to facilitate understanding of the present invention, other embodiments may come to mind to those skilled in the art without departing from the spirit and scope of the present invention. The invention should, therefore, be measured in terms of the claims that follow.

What is claimed is:

1. A method comprising:
    receiving, by a computing device, a key matrix having N rows and M columns of matrix keys, where N>2 and M>2;
    for each column of the key matrix, performing, by the computing device, arithmetic operations utilizing matrix keys of at least two selected rows of the key matrix to produce a secret device key which is part of a first set of secret device keys;
    producing in memory of the computing device, by the computing device, a shared secret key based on arithmetic operations on selected secret device keys of the first set of secret device keys, the selected secret device keys being a portion of the first set of secret device keys and being determined based on a first key selection vector received from a recipient digital platform; and
    using the shared secret key to provide a secure communication channel between a first digital platform and a second digital platform.

2. The method of claim 1, wherein the arithmetic operations include modular addition.

3. The method of claim 1, further comprising, prior to performing the arithmetic operations,
    generating a second key selection vector identifying the at least two selected rows of the key matrix from which to produce the first set of secret device keys.

4. The method of claim 3, wherein the second key selection vector is uniquely assigned to a sender digital platform.

5. The method of claim 4, further comprising, prior to producing the shared secret key,
    receiving the first key selection vector from the recipient digital platform in communication with the sender digital platform; and
    analyzing contents of the first key selection vector from the recipient digital platform to determine the selected secret device keys of the first set of secret device keys.

6. The method of claim 1, further comprising, prior to performing arithmetic operations on keys of at least two selected rows,
    dedicating the rows of the key matrix to a first classification; and
    dedicating the columns of the key matrix to a second classification.

7. The method of claim 6, wherein the first classification includes digital platforms designed to provide information to other digital platforms.

8. The method of claim 7, wherein the second classification includes digital platforms designed to receive information from other digital platforms.

9. The method of claim 1, wherein the producing of the shared secret key comprises:
    analyzing contents of the first key selection vector; and
    performing arithmetic operations on the selected secret device keys located in columns of the key matrix identified by the contents of the first key selection vector.

10. The method of claim 9, wherein the producing of the shared secret key further comprises:

performing a hash operation on results of the arithmetic operations of the selected secret device keys located in the column of the key matrix identified by the contents of the first key selection vector.

* * * * *